United States Patent [19]

Kato

[11] Patent Number: 4,834,440
[45] Date of Patent: May 30, 1989

[54] HAND DEVICE FOR INDUSTRIAL ROBOT
[75] Inventor: Hisao Kato, Aichi, Japan
[73] Assignee: Mitsubishi Denki Kabushiki Kaisha, Tokyo, Japan
[21] Appl. No.: 47,503
[22] Filed: Apr. 24, 1987

Related U.S. Application Data

[63] Continuation of Ser. No. 894,718, Aug. 8, 1986, abandoned, which is a continuation of Ser. No. 680,725, Dec. 12, 1984, abandoned.

[30] Foreign Application Priority Data

Dec. 15, 1983 [JP] Japan .................................. 58-235138

[51] Int. Cl.$^4$ .............................................. B25J 17/02
[52] U.S. Cl. .................................. 294/86.4; 219/86.1; 269/46; 414/917; 901/29; 901/41; 901/48
[58] Field of Search ............... 414/730, 735, 744 A, 414/917; 901/41, 42, 43, 48, 49, 27, 28, 29, 45, 36, ; 294/86.4; 269/46, 71; 248/281.1, 280.1; 219/86.1, 86.23, 124.34, 125.1; 267/179

[56] References Cited

U.S. PATENT DOCUMENTS 4,254,978  3/1981  Eshelman ........................ 267/179 X
4,437,635  3/1984  Pham ................................ 414/917
4,540,869  9/1985  Yasuoka .......................... 901/49 X

FOREIGN PATENT DOCUMENTS 2717221  11/1978  Fed. Rep. of Germany ...... 414/730
57-39107   8/1982  Japan .
 659378    4/1979  U.S.S.R. ............................. 901/29
 727422    4/1980  U.S.S.R. ............................. 901/48
 844261    7/1981  U.S.S.R. ............................. 901/49

Primary Examiner—Robert J. Spar
Assistant Examiner—Donald W. Underwood
Attorney, Agent, or Firm—Sughrue, Mion, Zinn, Mackpeak, and Seas

[57] ABSTRACT

A industrial robot head device for conveying a workpiece to a working apparatus and performing a working operation on the workpiece by the working apparatus is disclosed in which a grasping device provided with claws for grasping the workpiece is pivotally supported on a frame by a parallel linkage and urged by a spring system in the direction of displacement of the grasping device. The attitude of the workpiece in thereby accurately maintained at all times, even when the workpiece is being urged against a work head, for instance, a welding head gun of a spot welding machine.

8 Claims, 2 Drawing Sheets

HAND DEVICE FOR INDUSTRIAL ROBOT

This is a continuation of application Ser. No. 894,718, filed Aug. 8, 1986, now abandoned which is a continuation of application Ser. No. 680,725 filed Dec. 12, 1984, now abandoned.

BACKGROUND OF THE INVENTION

The present invention relates to an industrial robot hand device for conveying a workpiece to a work apparatus, for instance, a stationary spot welding machine or like. More particularly, the invention relates to a hand device for maintaining a desired workpiece attitude when the workpiece is held at a predetermined position by a workpiece grasping device such as one in which the workpiece is urged against the gun of a spot welding machine.

In the case, for instance, of spot welding wherein a workpiece is conveyed to a stationary spot welding machine, if a large reaction force is generated in a hand device or the robot body to which the hand device is attached when the workpiece is urged against a welding head gun, sometimes deformation or damage to the workpiece or the welding head occurs. Moreover, if the attitude of the workpiece is changed so as to displace its contact position with respect to the gun, it becomes impossible to perform the welding operation accurately.

A hand device intended to alleviate this problem is disclosed in Japanese Utility Modle Publication No. 39197/1982. According to this hand device, when the workpiece is urged against the gun, a large reaction force is not generated in the hand device or the robot body and the aforementioned problems are thereby eliminated. However, since this hand device is arranged such that a finger portion thereof has a degree of freedom with respect to an arm portion due to a bending action of a helical spring, the attitude of the workpiece with respect to the gun cannot be adequately controlled.

SUMMARY OF THE INVENTION

The present invention has been attained in order to alleviate the above-mentioned problems. It is a specific object of the invention to provide an industrial robot hand device in which the attitude of a workpiece does not vary and the contact position of the workpiece is not significantly changed even if a workpiece grasping device is pivotally supported on a fram of the hand by a parallel linkage and the workpiece is urged against a work head portion of a work apparatus.

DESCRIPTION OF THE PREFERRED EMBODIMENTS

Figure 1:
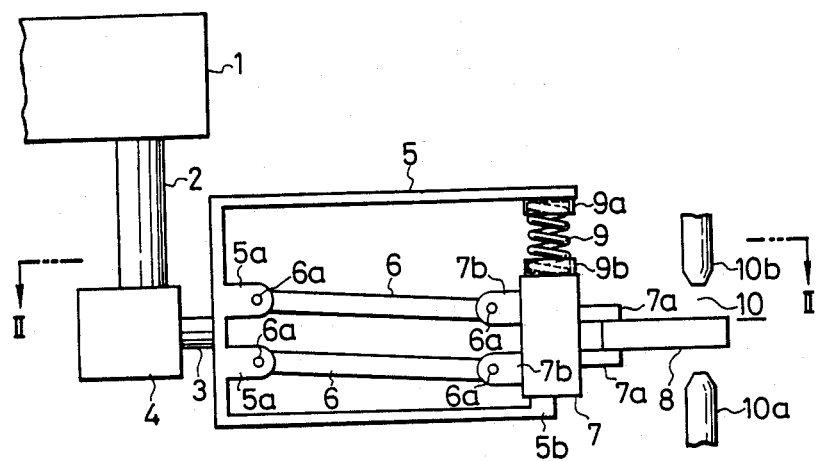
FIG. 1 is a side view showing a preferred embodiment of a hand device for an industrial robot of the invention.
Figure 2:
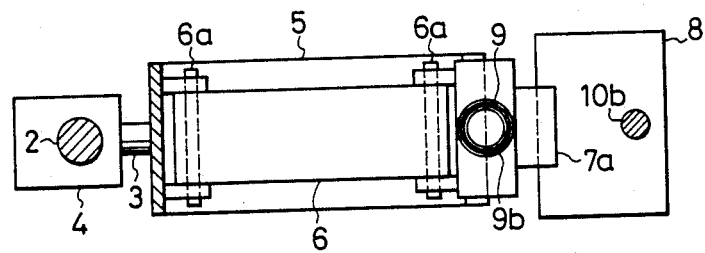
FIG. 2 is sectional view taken along a line II—II in FIG. 1.
Figure 3:
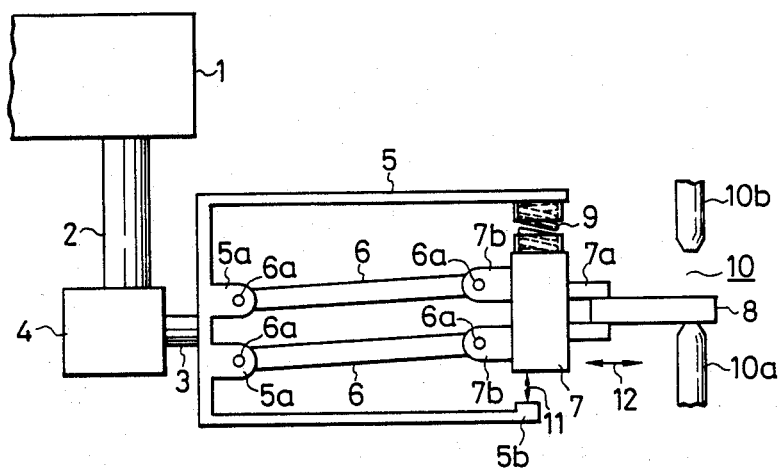
FIG. 3 is a side view illustrating a state in which a workpiece is urged toward a welding head of a spot welding machine.

In the drawings, reference numeral 1 designates a robot arm; 2, a vertically extending rotary shaft rotatably secured to the forward end of the arm 1; 3, a horizontally extending rotary shaft disposed perpendicularly to the vertical rotary shaft 2 and rotated by a rotary shaft driving mechanism 4 secured to the forward end of the vertical rotary shaft 2; 5, a frame of a hand device integrally secured to the horizontal rotary shaft 3; 6, a parallel linkage constituted by two rod members; 5a, supporting portions integrally secured to the frame 5 for supporting the parallel linkage; 7, a grasping device having grasping claws 7a for grasping a workpiece 8 and a driving mechanism for the grasping claws, parallel linkage supporting portions 7b being integrally secured to the grasping device. The grasping device 7 is pivotally supported by the parallel linkage 6. Reference numeral 6a designates pivot points. Reference numeral 9 designates a spring; 9a, a cup-shaped spring retainer secured to the frame 5; 9b, a cup-shaped spring retainer secured to the grasping device 7; 5b, a stop against which the grasping device 7 can abut; and 10, a gun of a spot welding machine having a fixed side 10a and a movable side 10b. The initial compression force of the spring 9 is selected to be a valve equal to or larger than the inertia force of the entire hand device, including the workpiece, so that no displacement occurs due to impact when the entire hand device begins to move downwardly.

In the thus-arranged mechanism, when the workpiece 8 is conveyed to the spot welding machine to perform a welding operation, the workpiece 8 is urged against the stationary side 10a of the gun of the welding machine such that the spring 9 is bent and a gap 11 of several millimeters is formed between the stop 5b at one end of the frame 5 and the grasping device 7. At this time, relative positional shifts or offset between the workpiece 8 and the spot welding machine are absorbed by changes in the dimension of the gap 11 (the dimension of compression of the spring) so that the workpiece 8 is not moved in the direction of the arrow 12 significantly, although it may be displaced upwardly (without change of inclination) thus enabling accurate operations to be performed. For instance, supposing the length of the parallel link 6 is 100 millimeters and the upward displacement of the same is set to be 3 millmeters, the displacement in the direction of the arrow 12 is a very small value, typically, about 0.05 millimeters.

Figure 4:
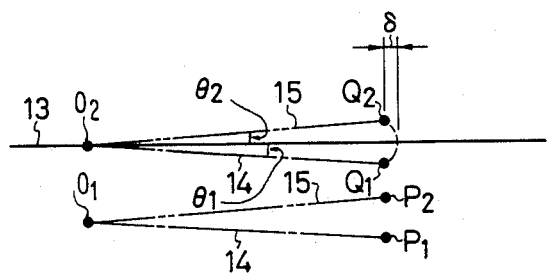
FIG. 4 is an diagram for explaining the operation of a parallel linkage shown in FIG. 1.

Further, as shown in FIG. 4, if the swing angle $\theta_1$ with respect to a reference line (horizontal line 13 in FIG. 4) perpendicular to the workpiece movement direction before it is urged against the gun 10a is made equal to that $\theta_2$ after urging the workpiece 8 against the gun 10a, the position $(P_2, Q_2)$ of the forward end of the parallel linkage 6 in the horizontal direction after the workpiece 8 is urged against the gun 10a is the same as that $(P_1, Q_1)$ before urging the workpiece 8 against the gun 10, so that welding can be made at accurately determined positions.

In FIG. 4, reference nurmeral (s) 14,14 designate center lines of the parallel linkage 6 before the workpiece 8 has been urged against the gun of the spot welding machine, and 15,15 the center lines of the parallel linkage when the workpiece 8 comes into contact with the spot welding machine. $\delta$ designates the displacement of the forward end when the parallel linkage 6 swings, that is, the displacement of the workpiece 8, and $O_1$ and $O_2$ the respective centers of the swinging movement, that is, the centers of each pivotal axis 6a. Even if the accuracy of the attitude of the workpiece against the gun of the welding machine is low, because only a compression force of a spring is transmitted to the hand device, there is no danger of deformation or damage to the hand device or robot body.

Although in the above-described embodiment the case has been decribed where the grasping device moves upwardly, the device can be applied to a case in which the rotation of the rotary shaft 3 causes the entire hand device to rotate by 90 degrees from the state shown in FIG. 1 so that the grasping device 7 moves in the horizontal direction.

Further, although in the above embodiment a case has been described where one of the guns is of the stationary type and the other is of the movable type, the same effect can be obtained even if both the guns are of the movable type by adjusting the position of the workpiece 8 such that a gap is formed between the stop 5b and the grasping device 7 in the state in which the workpiece 8 is grasped between the guns.

Moreover, although the above-described embodiment is described with respect to the case where a spot welding operation is performed by a spot welding machine, the present invention is not limited thereto and can be applied to an industrial robot in which a workpiece is conveyed to and worked by a working apparatus.

Thus, according to the present invention, since a workpiece grasping device is pivotally supported on a frame of a hand device of an industrial robot by a parallel linkage and is urged by a spring system in the displacement direction of the grasping device, an industrial robot hand device is attained in which the attitude of the workpiece is not significantly changed, even when the workpiece is urged against a work head of a work apparatus.

I claim:

1. An industrial robot hand device for conveying a workpiece to a work apparatus for performing a work operation an said workpiece, comprising:
   (a) a grasping device having a grasping member for grasping said workpiece;
   (b) a U-shaped frame for supporting said grasping device, opposing ends of said U-shaped frame defining first and second limit positions along a first displacement axis so as to restrict movement of said grasping device between said first and second limit positions;
   (c) a parallel linkage mechanism disposed completely within an interior of said U-shaped frame and connecting said frame to said grasping device for movement of said grasping device along said first displacement axis relative to said frame, said parallel linkage mechanism including a parallel linkage having a first portion pivotally supported on said U-shaped frame and a second portion pivotally supported on said gasping device, both of said first and said second portions being disposed within said interior of said U-shaped frame such that movement of said grasping device along a second displacement axis, perpendicular to said first displacement axis, is small relative to a length of said parallel linkage mechanism and to a distance between said first and second limit positions, said grasping device and said parallel linkage mechanism together maintaining said workpiece in a predetermined rotational attitude with respect to said first displacement axis; and
   (d) an elastic member disposed on said frame for providing a force for normally urging said grasping device toward said first limit position.

2. The industrial robot hand device according to claim 1, wherein said elastic member provides a force for urging said grasping device in a workpiece urging direction along said first displacement axis.

3. The industrial robot hand device according to claim 2, wherein said parallel linkage mechanism is disposed substantially perpendicularly to said workpiece urging direction.

4. The industrial robot hand device according to claim 1, wherein said elastic member elastically deforms to urge said grasping device in a workpiece urging direction parallel to said first displacement axis.

5. The industrial robot hand device according to claim 1, wherein a midpoint between said first and second limit positions and a pivot point of said parallel linkage mechanism together define a reference line perpendicular to said first displacement axis.

6. The industrial robot hand device according to claim 1, wherein said parallel linkage includes first and second members, each of said members having said first and second portions, and further having said first portion pivotally supported on said frame and said second portion pivotally supported on said grasping device.

7. The industrial robot hand device as claimed in claim 1, wherein said grasping device comprises a pair of grasping claws for grasping a workpiece and parallel linkage supporting portions integrally secured to said grasping devics.

8. The industrial robot hand device according to claim 1, further comprising first and second cup-shaped spring retainers, one of said cup-shaped spring retainers being secured to said frame, and the other of said cup-shaped spring retainers being secured to said grasping device, said elastic member being disposed between said first and second cup-shaped spring retainers, and contacting both of said cup-shaped spring retainers.

* * * * *